United States Patent
Zhang

(10) Patent No.: US 8,046,931 B2
(45) Date of Patent: Nov. 1, 2011

(54) POSITIONING DEVICE

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 189 days.

(21) Appl. No.: 12/545,081

(22) Filed: Aug. 21, 2009

(65) Prior Publication Data
US 2010/0242294 A1  Sep. 30, 2010

(30) Foreign Application Priority Data

Mar. 24, 2009  (CN) .............. 2009 1 0301099

(51) Int. Cl.
*G01B 5/00* (2006.01)
*G01B 21/00* (2006.01)

(52) U.S. Cl. ............ 33/573; 33/549; 269/905; 269/297; 269/143

(58) Field of Classification Search .......... 33/1 BB, 33/533, 549, 551, 553, 554, 555, 573, 832, 33/833; 248/542, 543, 904; 269/3, 6, 143, 269/152, 249, 252, 254 CS, 254 R, 291, 297, 269/307, 308, 905
See application file for complete search history.

(56) References Cited

U.S. PATENT DOCUMENTS

| | | | | |
|---|---|---|---|---|
| 649,011 A * | 5/1900 | Szafka | ............................ | 33/32.2 |
| 1,221,317 A * | 4/1917 | Haller | ........................ | 144/288.5 |
| 2,452,985 A * | 11/1948 | Bourdette | ........................ | 269/40 |
| 2,516,965 A * | 8/1950 | Dresser | ........................ | 211/60.1 |
| 2,799,920 A * | 7/1957 | Hansen | ............................ | 269/17 |
| 3,621,580 A * | 11/1971 | Tovaglieri | ........................ | 33/555 |
| 3,713,643 A * | 1/1973 | Gerstenberger | .............. | 493/405 |
| 3,780,441 A * | 12/1973 | Kunert | ............................ | 33/543 |
| 4,274,205 A * | 6/1981 | Starr et al. | ........................ | 33/502 |
| 5,014,439 A * | 5/1991 | Butzin et al. | ........................ | 33/533 |
| 6,671,973 B2 * | 1/2004 | Takemura et al. | .............. | 33/551 |
| 7,328,518 B2 * | 2/2008 | Taniuchi et al. | ................ | 33/553 |
| 7,509,751 B2 * | 3/2009 | Lee | ................................ | 33/542 |

FOREIGN PATENT DOCUMENTS

| | | | | |
|---|---|---|---|---|
| FR | 2542080 A | * | 9/1984 | |
| JP | 06201365 A | * | 7/1994 | |
| JP | 11173928 A | * | 7/1999 | |

* cited by examiner

Primary Examiner — Richard A. Smith
(74) Attorney, Agent, or Firm — Altis Law Group, Inc.

(57) ABSTRACT

A positioning device for positioning an object includes a platform, a slide rail vertically extending from the platform, two standard units, and a retaining unit. The standard units are slidably mounted to the slide rail to abut against a first side of the object to cooperatively define a position reference plane for the object. The retaining unit includes a fixing block fixed to the high standard unit, a slide bar slidably mounted to the fixing block, a holding arm fixed to the slide bar to abut against a second side opposite to the first side of the object, and a spring to bias the slide bar to ensure that the holding arm abuts against the second side of the object.

17 Claims, 6 Drawing Sheets

POSITIONING DEVICE

CROSS-REFERENCE TO RELATED APPLICATION

The present application is related to a copending U.S. patent application, titled "DETECTING APPARATUS", with the application Ser. No. 12/510,279, assigned to the same assignee as the present application.

BACKGROUND

1. Technical Field

The present disclosure relates to positioning devices, and more particularly to a positioning device to aid in positioning an object to be measured.

2. Description of Related Art

Often, in development environment, objects needing to be measured are manually held in position while measurements are taken. Manually handling the objects may distort or damage the objects leading to poor measurement accuracy.

DETAILED DESCRIPTION

Figure 1:
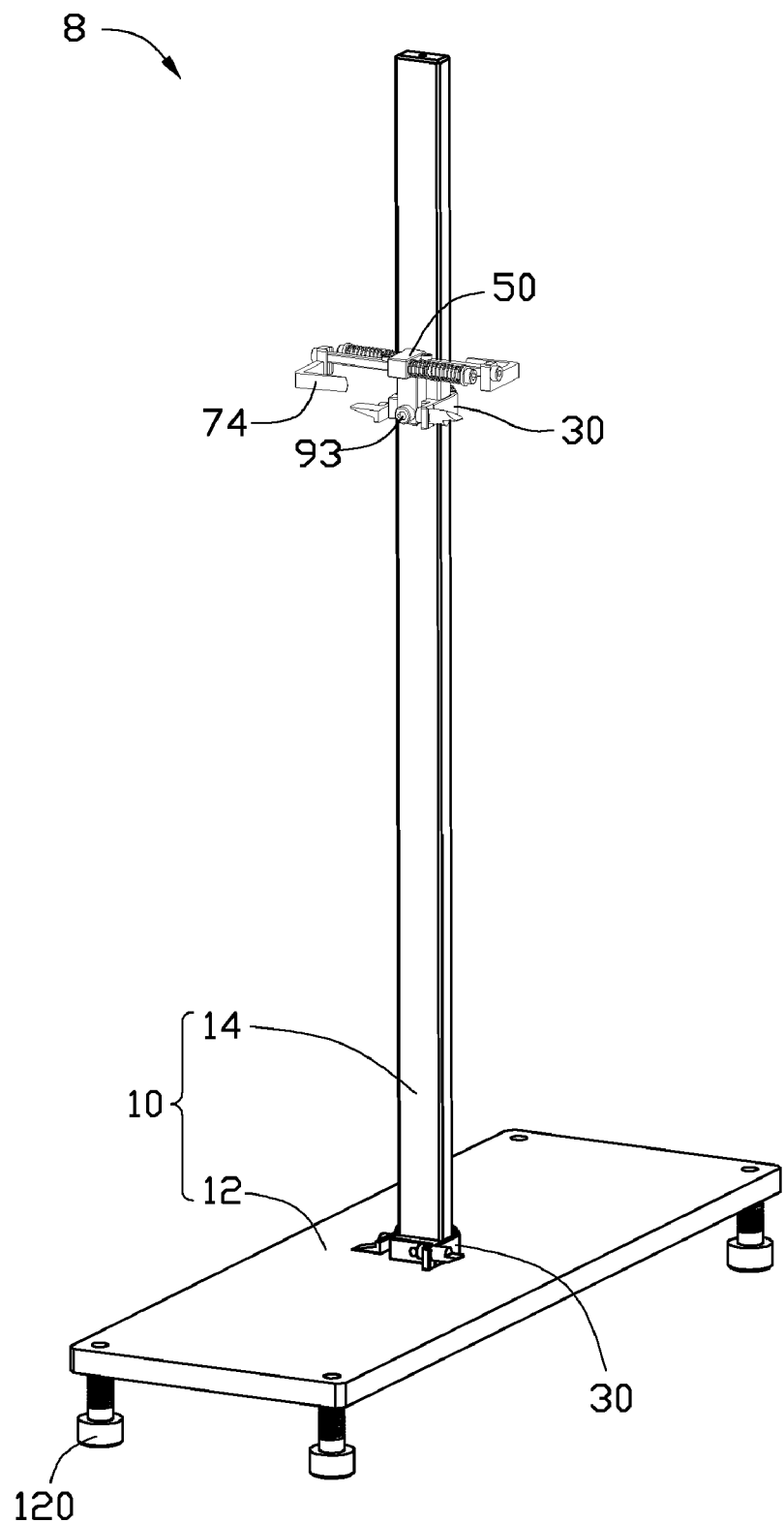
FIG. 1 is an isometric view of an embodiment of a positioning device, the positioning device including two standard units and a retaining unit.

Referring to FIG. 1, an embodiment of a positioning device 8 includes a supporting member 10, two standard units 30, and a retaining unit 50.

The supporting member 10 includes a platform 12, and a slide rail 14 vertically extending up from the platform 12. Four support poles 120 extend from a bottom of the platform 12, opposite to the slide rail 14. A cross section of the slide rail 14 is rectangular.

Figure 2:
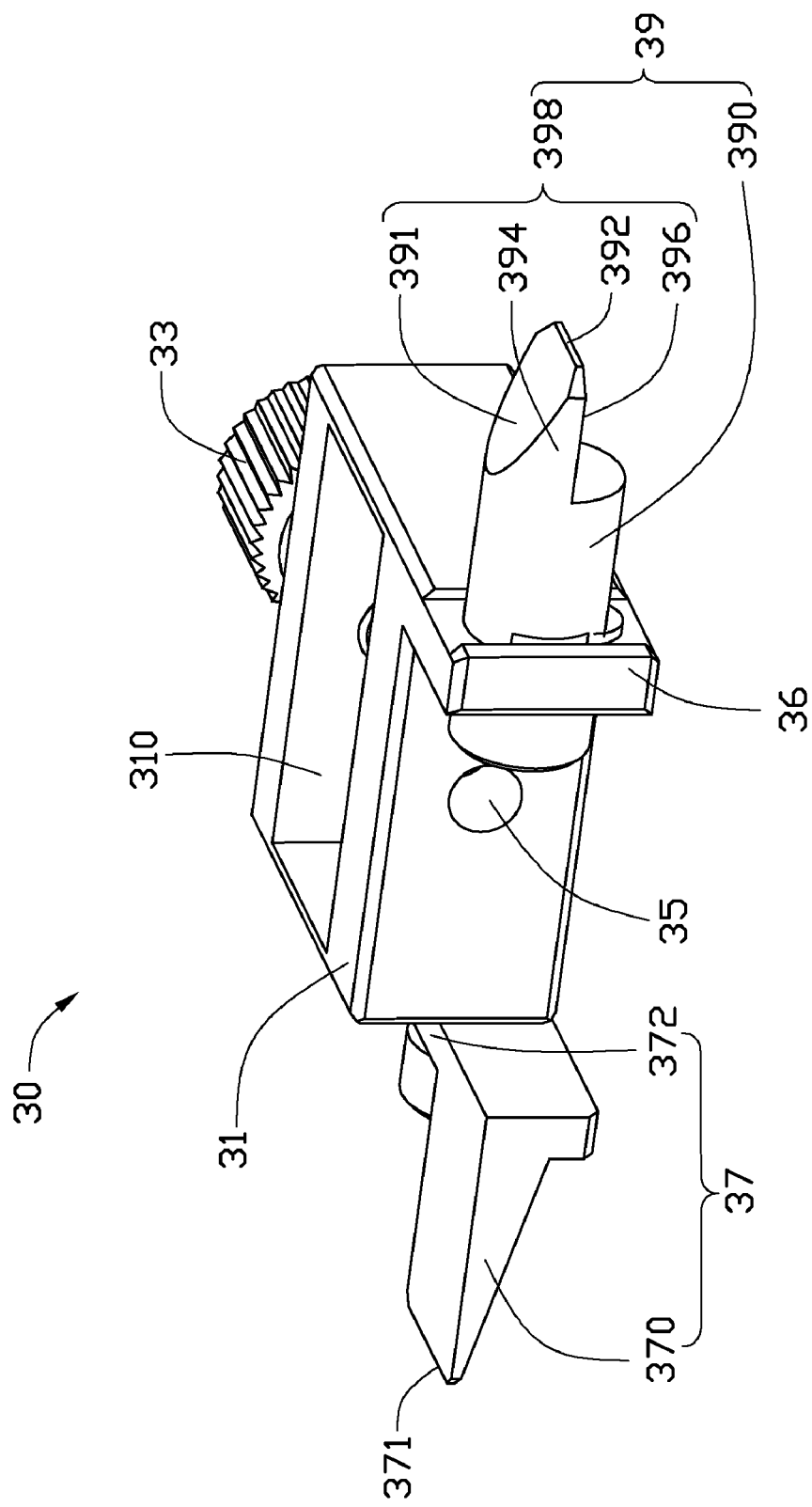
FIG. 2 is an isometric view of one of the standard units of FIG. 1.

Referring to FIG. 2, the two standard units 30 are the same. Each standard unit 30 includes a main body 31, a first reference element 37, and a second reference element 39.

The main body 31 is generally rectangular. A rectangular through hole 310 is defined in a center, through a top and a bottom of the main body 31. A screw hole (not labeled), communicating with the through hole 310, is defined in a first side of the main body 31. A hand screw 33 is engaged in the screw hole. A screw hole 35 is defined in a second side opposite to the first side of the main body 31. A projecting portion 36 extends from the second side of the main body 31, and is adjacent to a first end of the main body 31.

The second reference element 39 is mounted to the projecting portion 36 of the main body 31. The second reference element 39 includes a cylinder 390 fixed to the projecting portion 36, and a semi-cylinder 398 extending from an end of the cylinder 390 towards a direction away from the main body 31. The semi-cylinder 398 includes a circular side 394 and a flat side 396. A part of the circular side 394 is slantingly cut off to form a slanting surface 391, opposite to the flat side 396 and forming a thin tip end 392 out of a distal end of the semi-cylinder 398.

The first reference element 37 is mounted to a second end opposite the first end of the main body 31. The first reference element 37 includes a fixing portion 372 fixed to the first end of the main body 31, and a wedge-shaped reference portion 370 extending from the fixing portion 372 and aligning with the second reference element 39. The reference portion 370 includes a thin tip end 371 away from the fixing portion 372.

Figure 3:
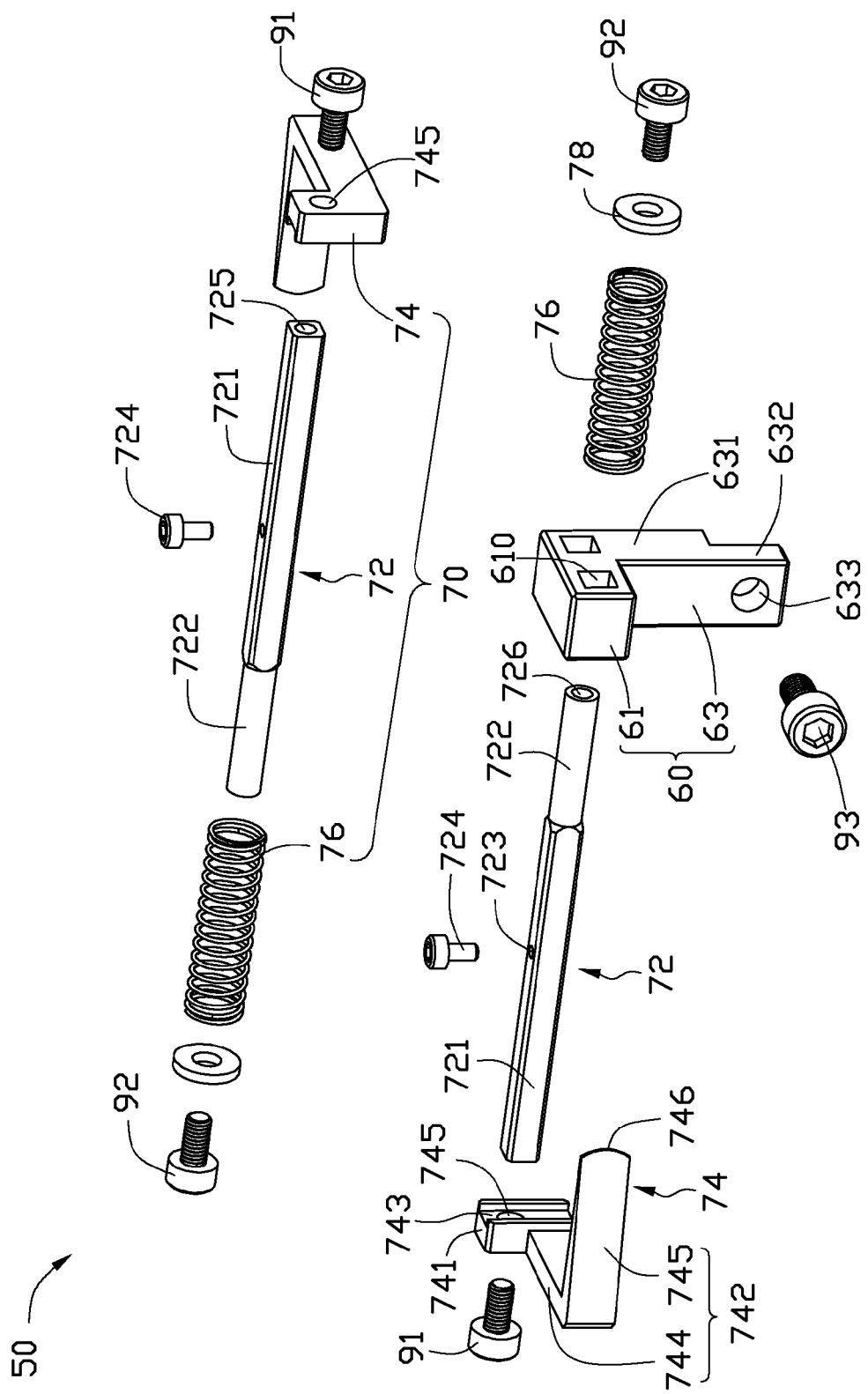
FIG. 3 is an exploded, isometric view of the retaining unit of FIG. 1.

Referring to FIG. 3, the retaining unit 50 includes a fixing block 60, and two clipping units 70 movably mounted to the fixing block 60.

The fixing block 60 is generally 7-shaped and includes a horizontal portion 61, and a vertical portion 63 perpendicularly extending down from the horizontal portion 61. The horizontal portion 61 horizontally defines two spaced rectangular through holes 610. The vertical potion 63 is step-shaped and includes a thick first piece 631 extending from the horizontal portion 61, and a thin second piece 632 extending from a distal end of the first piece 631. A through hole 633 is defined in the second piece 632.

The two clipping units 70 are the same. Each clipping unit 70 includes a slide bar 72, a holding arm 74, and a spring 76.

The slide bar 72 includes a rectangular shaft 721 and a circular shaft 722 extending from a first end of the rectangular shaft 721. The rectangular shaft 721 matches the rectangular through holes 610 of the fixing block 60. Diameter of the circular shaft 722 is less than a smallest width of the rectangular shaft 721. A fixing hole 723 is defined in a side of the rectangular shaft 721. A screw hole 725 is longitudinally defined in a second end of the rectangular shaft 721. A screw hole 726 is defined in a distal end of the circular shaft 722.

The holding arm 74 includes a rectangular fixing portion 741, and an L-shape claw 742 extending from a first side of the fixing portion 741. A groove 743 is defined in a second side adjacent to the first side of the fixing portion 741. A hole 745 is defined in a bottom of the second side through a third side opposite to the second side of the fixing portion 741. The claw 742 includes a first section 744 perpendicularly extending from the first side of the fixing portion 741, and a second section 745 perpendicularly extending from a distal end of the first section 744 towards a direction opposite to the third side of the fixing portion 741. The second section 745 is wedge-shaped and includes a thin arc-shaped distal end 746.

In assembling the retaining unit 50, a fastener 724 is engaged in the fixing hole 723 of each slide bar 72. The second end of the rectangular shaft 721 of each slide bar 72 is received in the groove 743 of the fixing portion 743 of the corresponding holding arm 74. A screw 91 is extended through the hole 745 of the fixing portion 743 of each holding arm 74, and engaged in the screw hole 725 of the rectangular shaft 721 of the corresponding slide bar 72, to fix each holding arm 74 to the corresponding slide bar 72. The circular shafts 722 of the slide bars 72 are respectively extended through the rectangular through holes 610 of the fixing block 60 from opposite directions. Each spring 76 is fitted about the corresponding circular shaft 722. A screw 92 is extended through a washer 78, and engaged in the screw hole 726 of each circular shaft 722, such that each spring 76 is sandwiched between the horizontal portion 61 of the fixing block 60 and the corresponding washer 78.

It is noted that each washer 78 is configured to be abutted against by the corresponding spring 76, and the screws 92 are for fixing the washers 78. Therefore, a blocking portion may directly extend from each circular shaft 722 to be abutted against by the corresponding spring 76 in other embodiments, instead of using the washer 78 and the screw 92.

It is noted that each fastener 724 is configured to make the corresponding slide bar 72 be blocked by the fixing block 60 under restoration of the spring 76. Therefore, a blocking portion may directly extend from each rectangular shaft 721 instead of using the fastener 724. Furthermore, because the springs 76 need not be compressed all the time, the fasteners 724 may be omitted in other embodiments.

In assembling the positioning device 8, each of the assembled standard units 30 is slidably mounted to the slide rail 14 of the supporting member 10 via the through hole 310 of the standard unit 30 fitting about the slide rail 14. The flat sides 396 of the second reference elements 39 of the standard units 30 face each other. The first piece 631 of the fixing block 60 of the assembled retaining unit 50 is supported on the main body 31 of the high standard unit 30, and a screw 93 is extended through the through hole 633 of the second piece 632 of the fixing block 60 and engaged in the screw hole 35 of the main body 31 of the corresponding standard unit 30, so as to fix the retaining unit 50 to the corresponding standard unit 30.

In use, the standard units 30 are slid to desired height levels according to an object that is to be detected, and the standard units 30 are fixed at the height levels via tightening the hand screws 33. The positioning device 8 can be used to position an object. Hereinafter, a flat object 100 with bent edges 101 (see FIGS. 4 and 5) is taken as an example to introduce how to use the positioning device 8.

Figure 4:
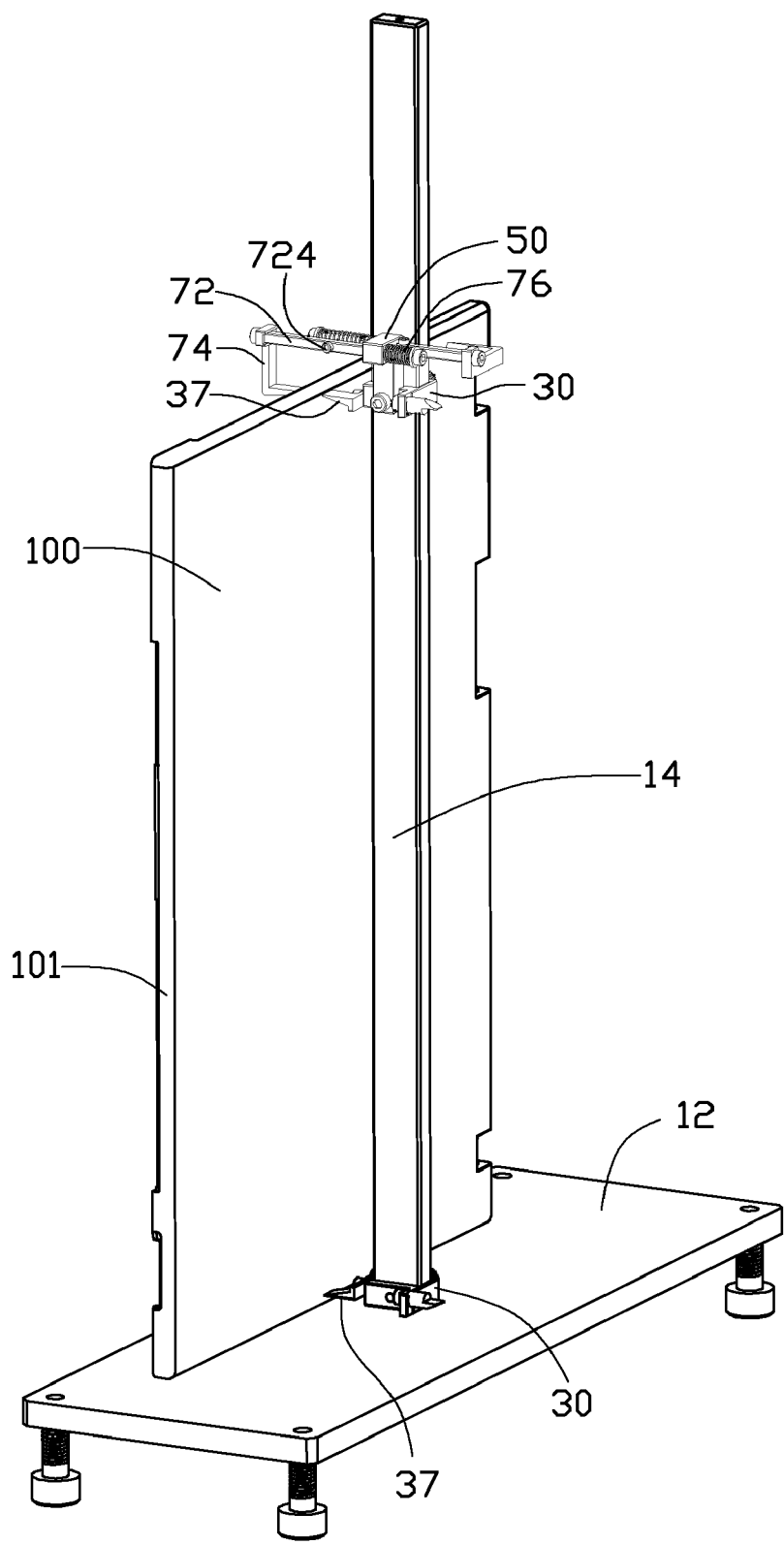
FIGS. 4, 5 and 6 are assembled views showing the positioning device in use.
Figure 5:
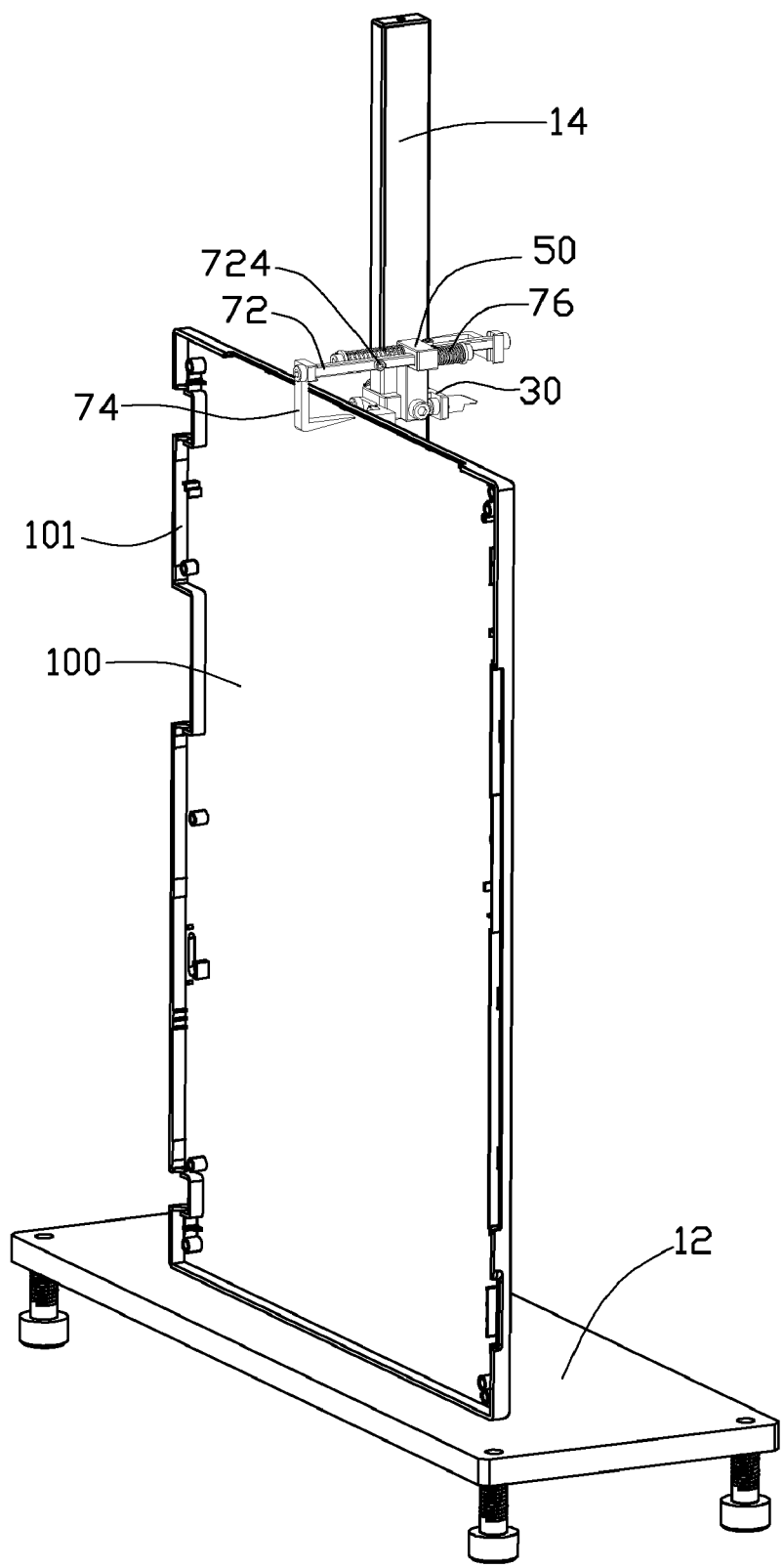

Referring to FIG. 4 and FIG. 5, in one embodiment, the first reference elements 37 of the standard units 30 and the holding arm 74 of one of the clipping units 70 of the retaining unit 50, which are located at a same side of the slide rail 14, are used to position the object 100.

In detail, before positioning the object 100, the corresponding slide bar 72 is slid outward until the circular shaft 722 is received in the corresponding through hole 610 of the fixing block 60, and the slide bar 72 is rotated, so as to adjust the distal end 746 of the corresponding holding arm 74 to a same height level as or a higher height level than the corresponding slide bar 72. The corresponding spring 76 is compressed. The corresponding slide bar 72 is slid inward to extend the rectangular shaft 721 of the slide bar 72 in the corresponding through hole 610. A lower end of the object 100 abuts against the platform 12. A side of the object 100, which does not include the bent edges 101, abuts against the tip ends 371 of the first reference elements 37. Here, the tip ends 371 of the first reference elements 37 are adjacent to a top and a bottom of the object 100 and cooperatively define a position reference plane for the object 100. The corresponding slide bar 72 is slid outward and rotated to put the distal end 746 of the corresponding holding arm 74 to its lowest position. The slide bar 72 is slid inward, so that the distal end 746 of the corresponding holding arm 74 abuts against the object 100 opposite to the first reference elements 37, to prevent the object 100 from falling over. Therefore, the object 100 is positioned. Here, the spring 76 biases the slide bar 72 to ensure that the distal end 746 of the corresponding holding arm 74 abuts against the object 100.

Figure 6:
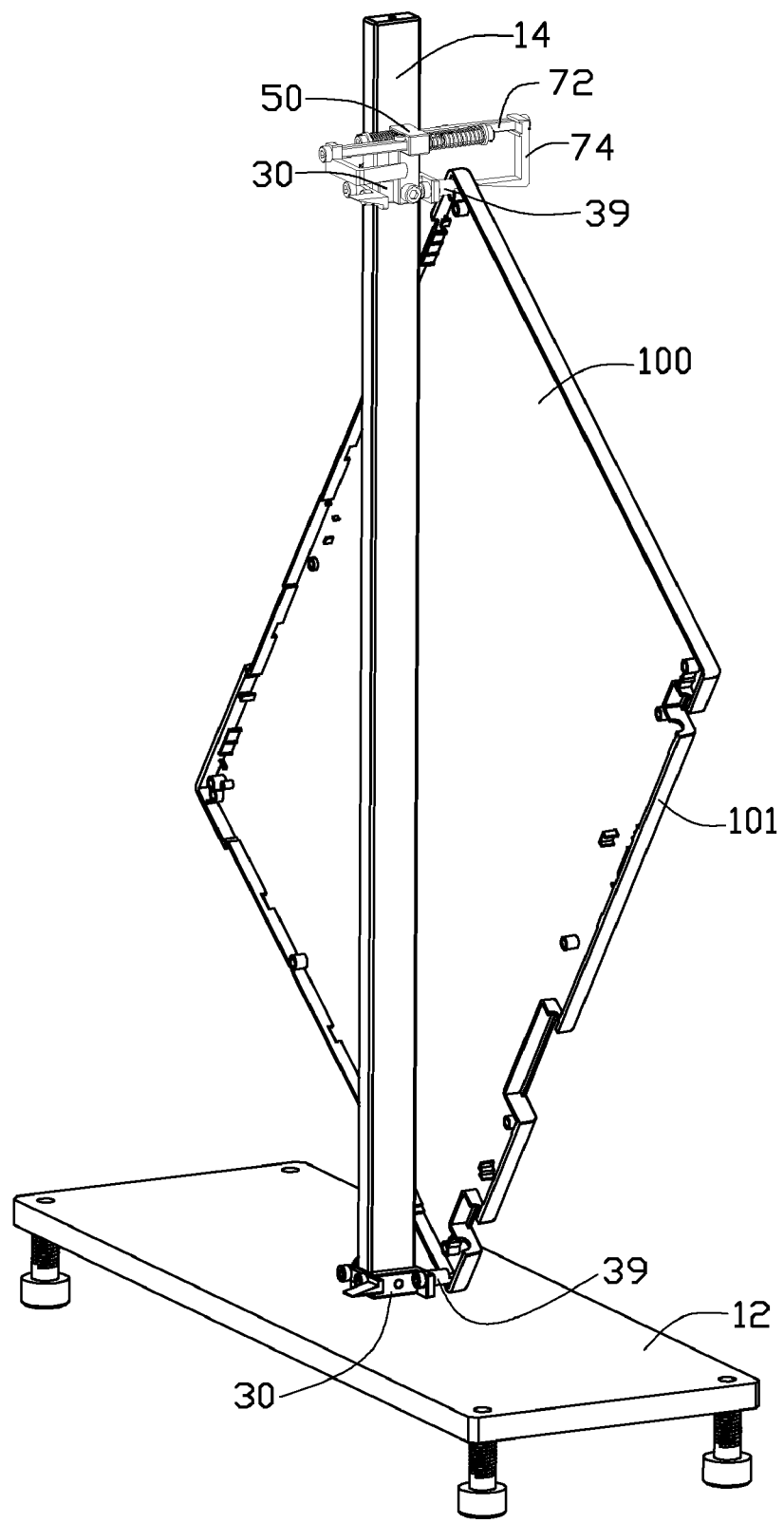

Referring to FIG. 6, in another embodiment, the second reference elements 39 of the standard units 30 and the holding arm 74 of the other one of the clipping units 70 of the retaining unit 50, are used to position the object 100.

In detail, before positioning the object 100, the corresponding slide bar 72 is slid outward until the circular shaft 722 is received in the corresponding through hole 610 of the fixing block 60, and the slide bar 72 is rotated, so as to adjust the distal end 746 of the corresponding holding arm 74 to a same height level as or a higher height level than the corresponding slide bar 72. The corresponding spring 76 is compressed. The corresponding slide bar 72 is slid inward to extend the rectangular shaft 721 of the slide bar 72 in the corresponding through hole 610. A side of the object 100, which includes the bent edges 101, faces the slide rail 14. The second reference elements 39 are respectively received in two corners located at opposite ends of a diagonal line of the object 100, while the tip ends 392 of the second reference elements 39 abut against the object 100. Here, the tip ends 392 cooperatively define a position reference plane for the object 100. The corresponding slide bar 72 is slid outward and rotated to put the distal end 746 of the corresponding holding arm 74 to its lowest position. The slide bar 72 is slid inward, so that the distal end 746 of the corresponding holding arm 74 abuts against the object 100, to prevent the object 100 from falling over. Thereby, the object 100 is properly positioned, and the spring 76 biases the slide bar 72 to ensure that the distal end 746 of the corresponding holding arm 74 abuts against the object 100.

It is noted that the tip ends 371 of the first reference elements 37 and the tip ends 392 of the second reference elements 39 should be processed to be as flat and thin as possible, so as to reduce contacting area when the tip ends 371 or 392 abut against the object 100, in order to prevent the object 100 from being deformed by the tip ends 371 or 392. Therefore, accuracy of detecting the object 100 is greater.

It is noted that the distal end 746 of each holding arm 74 is processed to be thin and arc-shaped, so as to substantially achieve point contact between the retaining unit 50 and the object 100, which can improve detecting accuracy for the object 100.

It is obvious that the first reference elements 37 or the second reference elements 39 may be independently utilized. Therefore, in other embodiments, the first reference elements 37 or the second reference elements 39 together with the corresponding clipping unit 70 may be omitted.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A positioning device for positioning an object, comprising:

a platform;

a slide rail vertically extending from the platform;

two standard units slidably mounted to the slide rail, one above the other, to abut against a first side of the object to cooperatively define a position reference plane for the object; and a retaining unit comprising a fixing block fixed to the higher one of the standard units, a slide bar slidably mounted to the fixing block, a holding arm fixed to the slide bar to abut against a second side opposite to the first side of the object, and a spring to bias the slide bar to ensure that the holding arm abuts against the second side of the object;

wherein the holding arm comprises a fixing portion fixed to an end of the slide bar, and a claw extending from the fixing portion to abut against the second side of the object.

2. The positioning device of claim 1, wherein each of the standard units comprises a main body defining a through hole, the standard unit is slidable along the slide rail via the slide rail being inserted though the through hole, a screw hole is defined in the main body and communicates with the through hole, and a screw is engaged in the screw hole and is operable to be tighten to abut against the slide rail.

3. The positioning device of claim 2, wherein each of the standard units comprises a reference element fixed to the main body, wherein the reference element comprises a tip end to abut against the object.

4. The positioning device of claim 3, wherein the reference element of each of the standard units comprises a fixing portion fixed to the corresponding main body, and a wedge-shaped reference portion extending from the fixing portion, wherein the tip end is formed on the reference portion, away from the corresponding main body.

5. The positioning device of claim 3, wherein each reference element comprises a cylinder dismountably fixed to the main body and a semi-cylinder extending from the cylinder, a distal end of the semi-cylinder forms the tip end.

6. The positioning device of claim 1, wherein the fixing block of the retaining unit defines a through hole, the slide bar of the retaining unit is extended through the through hole of the fixing block to be slidably mounted to the fixing block.

7. The positioning device of claim 6, wherein the through hole of the fixing block is rectangular, the slide bar comprises a rectangular shaft and a circular shaft extending from a first end of the rectangular shaft, wherein both shafts are co-axial, the rectangular shaft matches the through hole of the fixing block, diameter of the circular shaft is less than a smallest width of the rectangular shaft, and the holding arm is fixed to a second end opposite to the first end of the rectangular shaft.

8. The positioning device of claim 7, wherein the circular shaft of the slide bar comprises a first blocking portion, the spring is fitted about the circular shaft and located between the first blocking portion and a first side of the fixing block away from the holding arm.

9. The positioning device of claim 8, wherein the first blocking portion is a washer fixed to a distal end of the circular shaft.

10. The positioning device of claim 8, wherein the rectangular shaft of the slide bar comprises a second blocking portion, to block the slide bar by a second side opposite to the first side of the fixing block, under restoration of the spring.

11. The positioning device of claim 10, wherein the second blocking portion is a fastener radially fixed to the rectangular shaft of the slide bar.

12. The positioning device of claim 1, wherein the claw is L-shaped and comprises a first section extending from the fixing portion and perpendicular with the slide bar, and a second section perpendicularly extending from a distal end of the first section towards the slide rail.

13. The positioning device of claim 12, wherein the second section of the claw is wedge-shaped and includes a thin arc-shaped distal end to abut against the second side of the object.

14. The positioning device of claim 1, wherein a through hole is defined in the fixing portion of the holding arm, a screw hole is defined in the end of the slide bar, a screw is extended through the through hole and engaged in the screw hole to mount the holding arm to the end of the slide bar.

15. The positioning device of claim 1, wherein a groove is defined in the fixing portion of the holding arm and communicates with the through hole, the end of the slide bar is received in the groove.

16. A positioning device for positioning an object, comprising:
a platform;
a slide rail vertically extending from the platform;
two standard units slidably mounted to the slide rail, one above the other, to abut against a first side of the object to cooperatively define a position reference plane for the object; and
a retaining unit comprising a fixing block defining a through hole and fixed to the higher one of the standard units, a slide bar axially slidably extending in through hole of the fixing block, a holding arm fixed to the slide bar to abut against a second side opposite to the first side of the object, and a spring to bias the slide bar to ensure that the holding arm abuts against the second side of the object;
wherein the slide bar comprising a first segment and a second segment extending from an end of the first segment, the slide bar is rotatable relative to the fixing block in response to the second segment received in the through hole of the fixing block, to enable the object to be detached away from the positioning device, the slide bar is prevented from rotating in response to the first segment being received in the through hole of the fixing block.

17. The positioning device of claim 16, wherein the through hole of the fixing block is rectangular, the first segment of the slide bar defines a rectangular cross section, the second segment of the slide bar defines a round cross section, the first and the second segments are co-axial with each other, the first segment matches the through hole of the fixing block, a diameter of the second segment is less than a smallest width of the first segment, and the holding arm is fixed to an end of the second segment opposite to the first segment.

* * * * *